United States Patent [19]

Lind

[11] Patent Number: 5,105,722
[45] Date of Patent: Apr. 21, 1992

[54] MECHANICALLY CONTROLLED POWER BOOSTER

[75] Inventor: Klaus Lind, Woelfersheim, Fed. Rep. of Germany

[73] Assignee: Alfred Teves GmbH, Frankfurt am Main, Fed. Rep. of Germany

[21] Appl. No.: 594,253

[22] Filed: Oct. 9, 1990

[30] Foreign Application Priority Data

Oct. 20, 1989 [DE] Fed. Rep. of Germany ....... 3934923

[51] Int. Cl.⁵ ............................................. F15B 9/10
[52] U.S. Cl. .................................. 91/374; 91/376 R
[58] Field of Search ............... 91/368, 369.1, 369.2, 91/369.3, 369.4, 374, 376 R; 251/120

[56] References Cited

U.S. PATENT DOCUMENTS

| | | | |
|---|---|---|---|
| 1,630,973 | 5/1927 | Schmidt | 251/120 x |
| 2,690,767 | 10/1954 | Sage | 251/120 X |
| 3,556,070 | 12/1971 | Holcomb | 251/120 X |
| 3,691,903 | 9/1972 | Shellhanse | 91/369.2 X |
| 3,857,542 | 12/1974 | Heymann | 251/120 |
| 4,716,814 | 1/1988 | Yamakoshi | 91/376 R |
| 4,718,327 | 1/1988 | Myers | 91/369.4 |
| 4,936,195 | 6/1990 | Uyama | 91/369.3 |

FOREIGN PATENT DOCUMENTS

| | | | |
|---|---|---|---|
| 3402962 | 8/1985 | Fed. Rep. of Germany | 91/369.2 |
| 3413739 | 10/1985 | Fed. Rep. of Germany | 91/369.1 |
| 2051987 | 1/1981 | United Kingdom | 91/369.2 |
| 2061454 | 5/1981 | United Kingdom | 91/369.2 |
| 2095778 | 10/1982 | United Kingdom | 91/369.3 |

Primary Examiner—Edward K. Look
Assistant Examiner—Todd Mattingly
Attorney, Agent, or Firm—Robert P. Seitter; J. Gordon Lewis

[57] ABSTRACT

In order to eliminate the noises caused on operation of a vacuum brake power booster, a radially outwardly extending air-conducting surface (26), which tapers toward a poppet valve member (7) closing a sealing seat (19) and which is opposite to the channel (25) on actuation, is adjacent to the radially outwardly disposed area of the sealing seat (19) designed on a valve piston (10), the sealing seat being released on displacement of the valve piston (10) and permitting inflow of the atmospheric air into the working chamber (3) of the booster via a radially extending channel (25).

14 Claims, 2 Drawing Sheets

MECHANICALLY CONTROLLED POWER BOOSTER

TECHNICAL FIELD

The present invention relates to a mechanically controlled power booster, in particular for brake systems of automotive vehicles, including a booster housing which is sealingly subdivided into a vacuum chamber and a working chamber by an axially movable wall to which a pneumatic differential pressure can be applied. The booster also includes a control housing which operatively engages the movable wall and which incorporates a control valve connecting the working chamber to the vacuum chamber or the atmosphere, respectively. The control valve is formed of a first sealing seat designed on the control housing, a second sealing seat designed on a valve piston, and a poppet valve member operable through the valve piston which is connected to an actuating rod, with the connection of the working chamber to the atmosphere being effected through a channel which extends roughly radially in the control housing.

BACKGROUND OF THE INVENTION

German published patent application 34 13 739 discloses a power booster of this kind. The special features of the known power booster include, in order to eliminate the suction noises caused on actuation by the inflowing air, an air-conducting element which is held by the actuating rod and projects into the interior of the poppet valve member. The element has radially outwardly extending conducting surfaces which are designed as flanges, grooves, ribs, or vanes. In the area of its sealing surface cooperating with the first sealing seat designed on the control housing, the poppet valve member has a cylindrical projection extending towards the valve piston and cooperating with the wall in the control housing that confines the first sealing seat; the projection prevents the end of the poppet valve member on the side of the valve piston from moving in a radial direction.

A disadvantage in the known power booster is the complicated design of the poppet valve member which is required for the desired deflection of the inflowing air, in particular in the area of the first sealing seat. The problematic assembly of the air-conducting element is also undesirable. When assembling the booster, an angular clearance at the actuating rod of roughly ±3° must be ensured, due to the kinematics of actuation, so that an annular gap must be maintained between the air-conducting element and the actuating rod. Consequently, the desired effect is impaired.

Another shortcoming is in the vertically arranged flange of the air-conducting element, which may reflect the striking air flow and cause turbulences and sound reflection.

SUMMARY OF THE INVENTION

Therefore, it is the object of the present invention to improve upon a known mechanically controlled power booster by simplifying the control assembly as well as, simultaneously, providing desired noise reduction.

The object is achieved according to the present invention by a radially outwardly disposed area of the second sealing seat extending into a radially outwardly extending air-conducting surface which tapers towards the poppet valve member and which is radially opposed to the channel on actuation.

An advantage of the present invention is that the air-conducting surface is designed integrally with the valve piston, with the valve piston being of a frustum-type design and its peripheral surface, acting as the air-conducting surface, being of a straight-line or concavely bent configuration as viewed in longitudinal cross-section.

Due to this design, the noise level of the air entering upon operation of the power booster is reduced considerably, and, respectively, the resonance behavior of the control housing and the guidance of the air flow in the control housing are positively influenced.

Further features, advantages, and applications of the present invention can be understood from the following description of four embodiments with reference to the accompanying drawings.

DETAILED DESCRIPTION OF THE INVENTION

Figure 1:
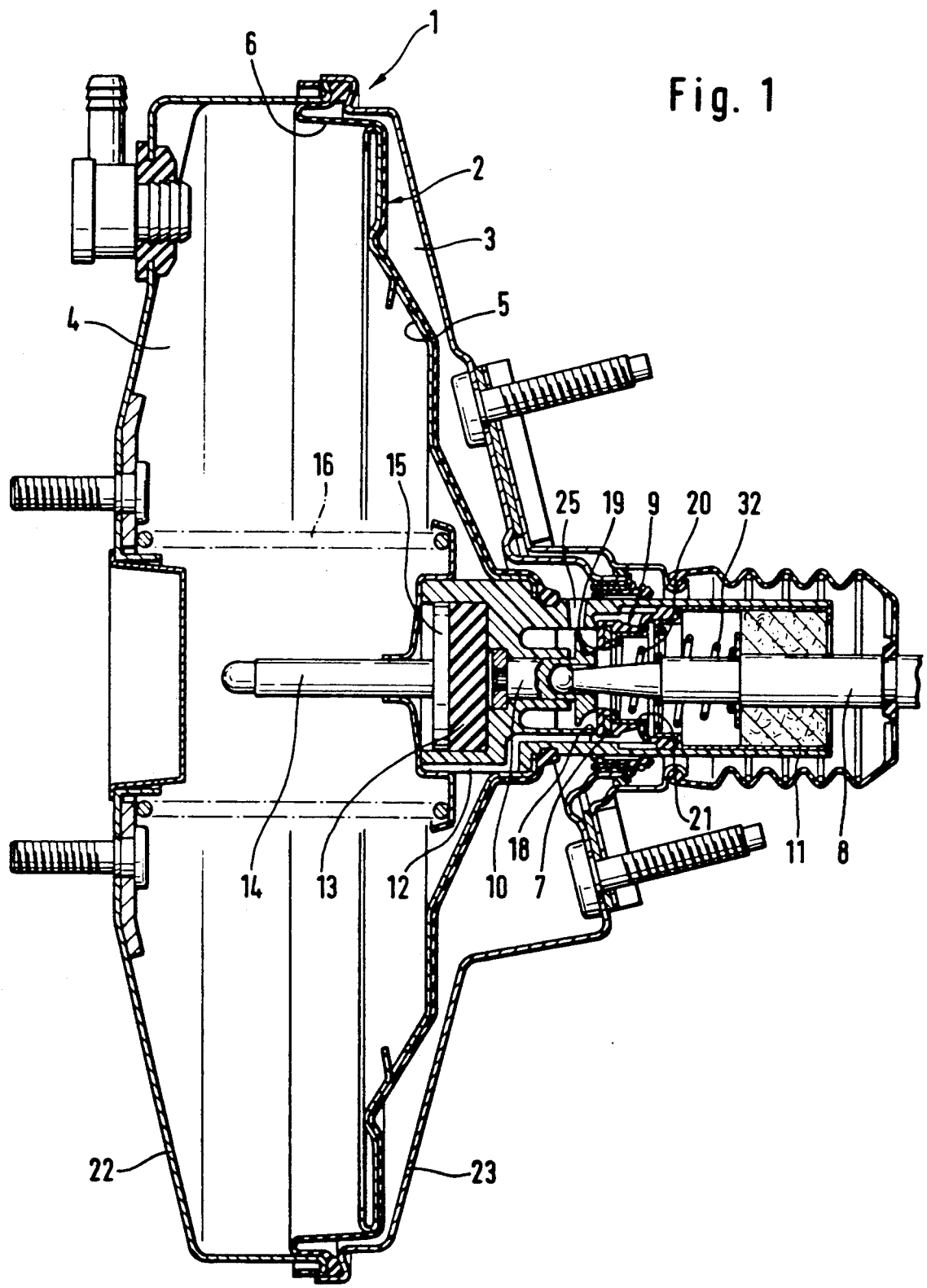
FIG. 1 is a longitudinal cross-section through a mechanically controlled power booster of the present invention.
Figure 2:
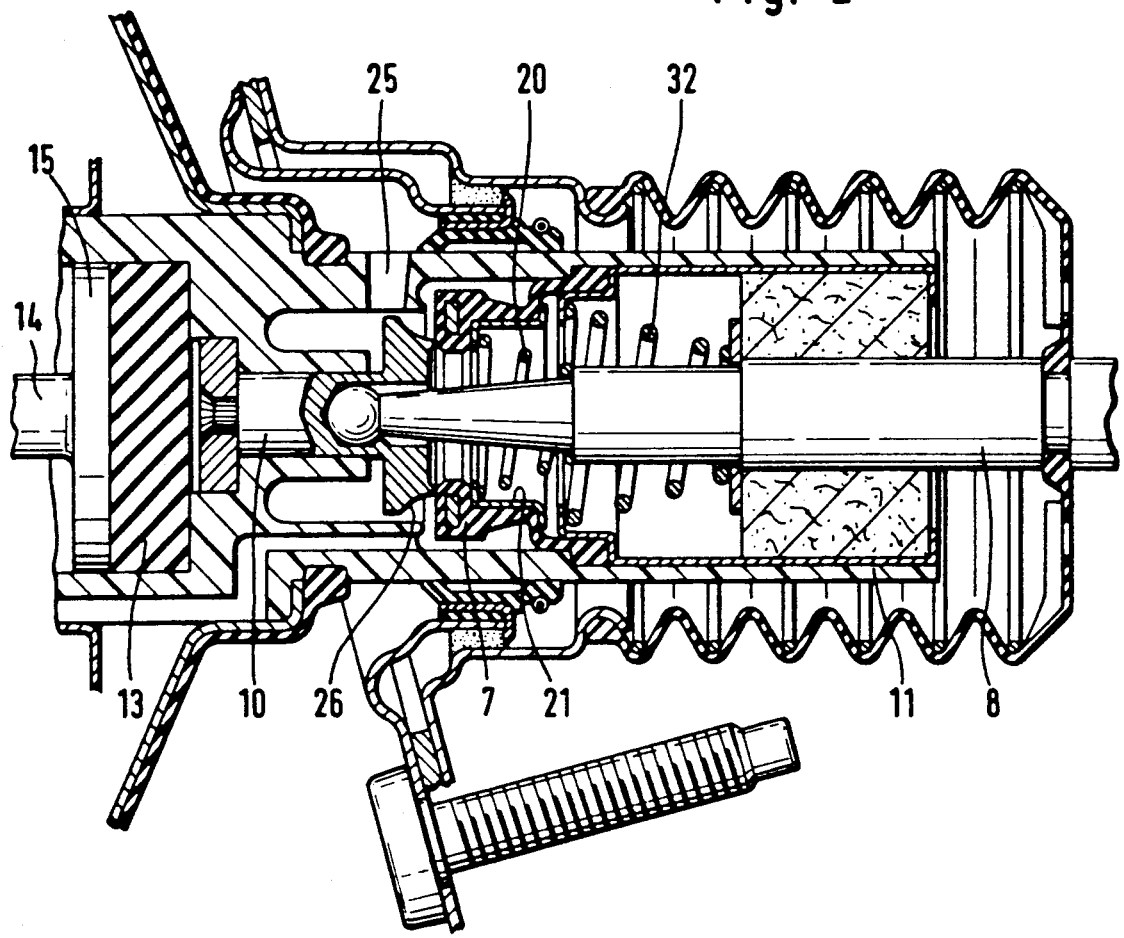
FIG. 2 is a longitudinal cross-section of the control valve housing of the power booster of the present invention on an enlarged scale.

The pneumatically controlled power booster shown in FIGS. 1 and 2 includes a booster housing 1 composed of two interconnected housing parts 22, 23 and subdivided into a working chamber 3 and a vacuum chamber 4 by an axially movable wall 2. This axially movable wall 2 consists of a deep-drawn, sheet-metal, diaphragm plate 5 and a flexible diaphragm 6 abutting thereon which, although not shown in more detail, forms a rolling diaphragm to form a seal between the outside periphery of the diaphragm plate 5 and the vacuum housing 1.

A control valve 9 operable by a piston rod 8 is accommodated in a control housing 11 which carries the movable wall 2 and is sealedly guided in the housing part 23. The valve 9 includes a first sealing seat 18 designed on the control housing 11, a second sealing seat 19 designed on a valve piston 10 connected to the piston rod 8, and a poppet valve member 7 cooperating with both sealing seats 18, 19 which is urged against the valve seat 19 through a prestressing sleeve 21 by a compression spring 20 supported on the piston rod 8. In the illustrated non-actuated position, the working chamber 3 communicates with the vacuum chamber 4 via a channel 12 extending laterally in the control valve housing 11.

A rubber-elastic reaction element 13 received in a front-end recess of the control housing 11 and a push rod 14 including a head flange 15 transmit the brake force onto an actuating piston of a master cylinder of the brake system (not shown) which is mounted on the end of the power booster on the vacuum side.

A resetting spring 16 illustrated schematically in the drawing and supported on a flange on the end wall of the booster housing 1 on the vacuum side keeps the movable wall 2 in the initial position shown. Further, a second compression spring 32 is arranged between the poppet valve member 7 and a collar designed on the piston rod 8, the force of which ensures that the valve piston 10 and/or valve seat 19 is preloaded in relation to the poppet valve member 7.

To connect the working chamber 3 to the atmosphere on actuation of the control valve 9, a channel 25 which extends approximately in a radial direction is designed in the control housing 11.

Figure 3:
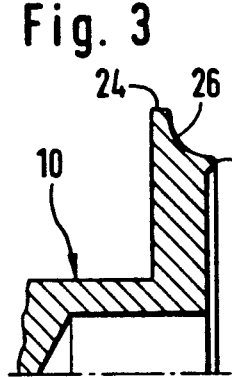
FIG. 3 is a partial cross-sectional view of the valve piston used on the power booster of FIGS. 1 and 2 on an enlarged scale.

As shown particularly in FIGS. 2 and 3, the valve piston 10 is preferably a frustum-type configuration, such that the radially outwardly disposed area of the sealing seat 19 extends into an air-conducting surface 26 which extends radially outwardly and tapers toward the poppet valve member 7. Preferably, the arrangement of the valve piston 10 in the control housing 11 is such that operation of the control valve 9, which displaces the valve piston 10 to the left in the drawing, displaces the air-conducting surface 26 into the area of the port of the channel 25 so that it is radially opposed to the channel 25. When the working chamber 3 is ventilated, this will create a smooth deflection of the outside air in the direction of the channel 25, the air flowing in through the control housing 11 at a high flow speed and entering the working chamber 3 without causing major turbulences.

As is shown in FIG. 3, the air-conducting surface 26 is formed by the peripheral surface of, and is integral with, the valve piston 10 displayed in FIGS. 1 and 2. Surface 26 is concavely curved, or circle-segment shaped, when viewed in longitudinal cross-section. Adjacent to the air-conducting surface 26 is a cylindrical portion 24 whose diameter is slightly less than the diameter of the area receiving the valve piston 10 in the control housing 11.

Figure 4:
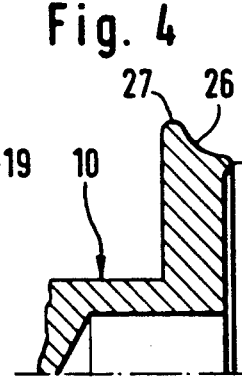
FIG. 4 is another embodiment of the valve piston of the power booster of the present invention.

In another embodiment of the valve piston 10 of the present invention shown in FIG. 4, the air-conducting surface 26, in a cross-section taken along the piston axis, is designed like the segment of a parabola and ends in the convexly curved, preferably semicircular portion 27 in longitudinal cross-section.

Figure 5:
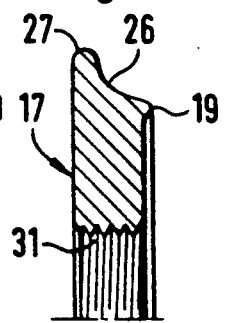
FIG. 5 is a cross-sectional view of a first embodiment of a ring cooperating with the valve piston.
Figure 6:
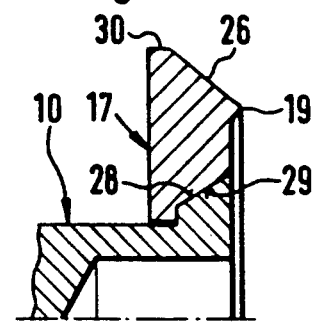
FIG. 6 is a cross-sectional view of a second embodiment of the ring cooperating with the valve piston.

Finally, as shown in FIGS. 5 and 6, the air-conducting surface 26 can be formed on a separate component part, such as a ring 17, which can be screwed to the valve piston 10 (not shown in FIG. 5) by an internal thread 31 schematically illustrated. An arrangement as shown in FIG. 6 is also possible wherein the ring 17 is slipped on the valve piston 10 and is cemented to it. For this purpose, the ring 17 includes an inward conical adhesive surface 28 which, in the assembled state, cooperates with a conical surface 29 designed on the valve piston 10. The air-conducting surface 26 formed by the peripheral surface of the ring 17 extends in a straight line in the illustration shown in FIG. 6 and is adjacent to a cylindrical portion 30, similar to the arrangement shown in FIG. 3.

What is claimed is:

1. A mechanically controlled power booster comprising:
   a booster housing;
   an axially movable wall within said booster housing sealingly subdividing said booster housing into a vacuum chamber and a working chamber;
   a control housing engaging said movable wall and having a radially extending channel connecting said working chamber to the atmosphere;
   a control valve within said control housing for selectively connecting said working chamber to said vacuum chamber and to the atmosphere, said control valve including:
   (a) a first sealing seat in said control housing,
   (b) a poppet valve member responsive to said valve piston, and
   (c) a valve piston having a cylindrical second sealing seat and a radially outwardly extending integral air-conducting surface tapering toward said poppet valve member which is radially opposite said channel in said control housing when said control valve is actuated; and
   a piston rod connected to said valve piston.

2. A mechanically controlled power booster comprising:
   a booster housing;
   an axially movable wall within said booster housing sealingly subdividing said booster housing into a vacuum chamber and a working chamber;
   a control housing engaging said movable wall and having a radially extending channel connecting said working chamber to the atmosphere;
   a control valve within said control housing for selectively connecting said working chamber to said vacuum chamber and to the atmosphere, said control valve including:
   (a) a first sealing seat in said control housing,
   (b) a poppet valve member responsive to said valve piston, and
   (c) a frustum-shaped valve piston having a second sealing seat and a radially outwardly extending air-conducting surface, wherein said air-conducting surface is an integral peripheral surface of said valve piston concave when viewed in longitudinal cross-section, tapes toward said poppet valve member, and is radially opposite said channel in said control housing when said control valve is actuated; and
   a piston rod connected to said valve piston.

3. A mechanically controlled power booster as claimed in claim 2 wherein said air-conducting surface is a circular segment when viewed in longitudinal cross-section.

4. A mechanically controlled power booster as claimed in claim 2 wherein said air-conducting surface is a parabolic segment when viewed in longitudinal cross-section.

5. A mechanically controlled power booster comprising:
   a booster housing;
   an axially movable wall within said booster housing sealingly subdividing said booster housing into a vacuum chamber and a working chamber;
   a control housing engaging said movable wall and having a radially extending channel connecting said working chamber to the atmosphere;
   a control valve within said control housing for selectively connecting said working chamber to said vacuum chamber and to the atmosphere, said control valve including:
   (a) a first sealing seat in said control housing,
   (b) a poppet valve member responsive to said valve piston, and (c) a valve piston having a ring including both a second sealing seat and a radially outwardly extending air-conducting surface tapering toward said poppet valve member which is radially opposite said channel in said control housing when said control valve is actuated; and a piston rod connected to said valve piston.

6. A mechanically controlled power booster as claimed in claim 5 wherein said valve piston is frustum-shaped and said air-conducting surface is a peripheral surface of said ring and is a straight line when viewed in longitudinal cross-section.

7. A mechanically controlled power booster as claimed in claim 5 wherein said valve piston is frustum-shaped and said air-conducting surface is a peripheral surface of said ring and is concave when viewed in longitudinal cross-section.

8. A mechanically controlled power booster as claimed in claim 7 wherein said air-conducting surface is a circular segment when viewed in longitudinal cross-section.

9. A mechanically controlled power booster as claimed in claim 7 wherein said air-conducting surface is a parabolic segment when viewed in longitudinal cross-section.

10. A mechanically controlled power booster as claimed in claim 5 wherein said ring is screwed to said valve piston.

11. A mechanically controlled power booster as claimed in claim 5 wherein said ring is slipped onto said valve piston.

12. A mechanically controlled power booster as claimed in claim 11 wherein said ring is cemented to said valve piston.

13. A mechanically controlled power booster comprising:

a booster housing;

an axially movable wall within said booster housing sealingly subdividing said booster housing into a vacuum chamber and a working chamber;

a control housing engaging said movable wall and having a radially extending channel connecting said working chamber to the atmosphere;

a control valve within said control housing for selectively connecting said working chamber to said vacuum chamber and to the atmosphere, said control valve including:

(a) a first sealing seat in said control housing, (b) a poppet valve member responsive to said valve piston, and (c) a valve piston having a second sealing seat curved convexly when viewed in longitudinal cross-section and a radially outwardly extending integral air-conducting surface tapering toward said poppet valve member which is radially opposite said channel in said control housing when said control valve is actuated; and a piston rod connected to said valve piston.

14. A mechanically controlled power booster as claimed in claim 13 wherein said second sealing seat has a semicircular contour when viewed in longitudinal cross-section.

* * * * *